Patented Aug. 24, 1937

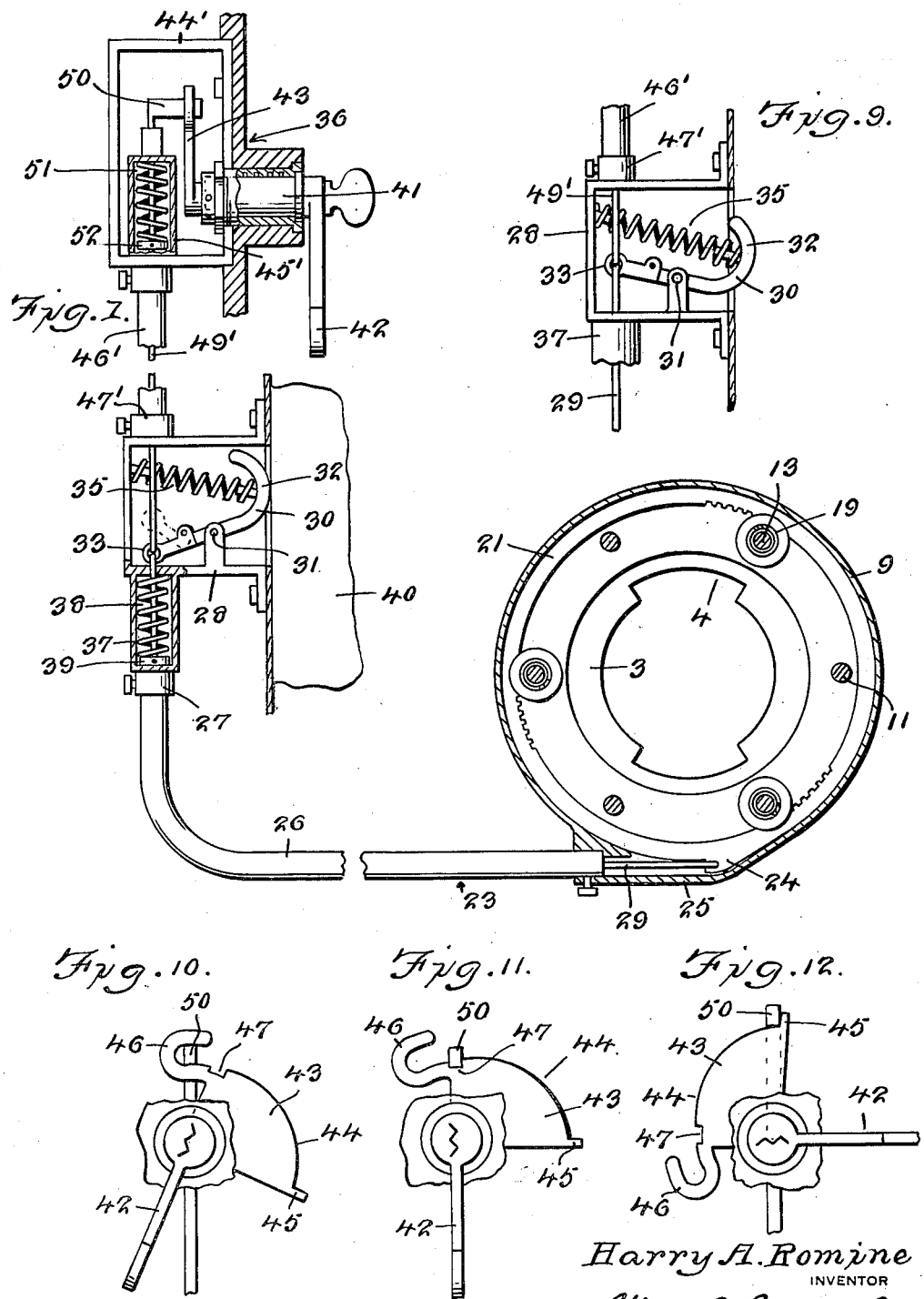

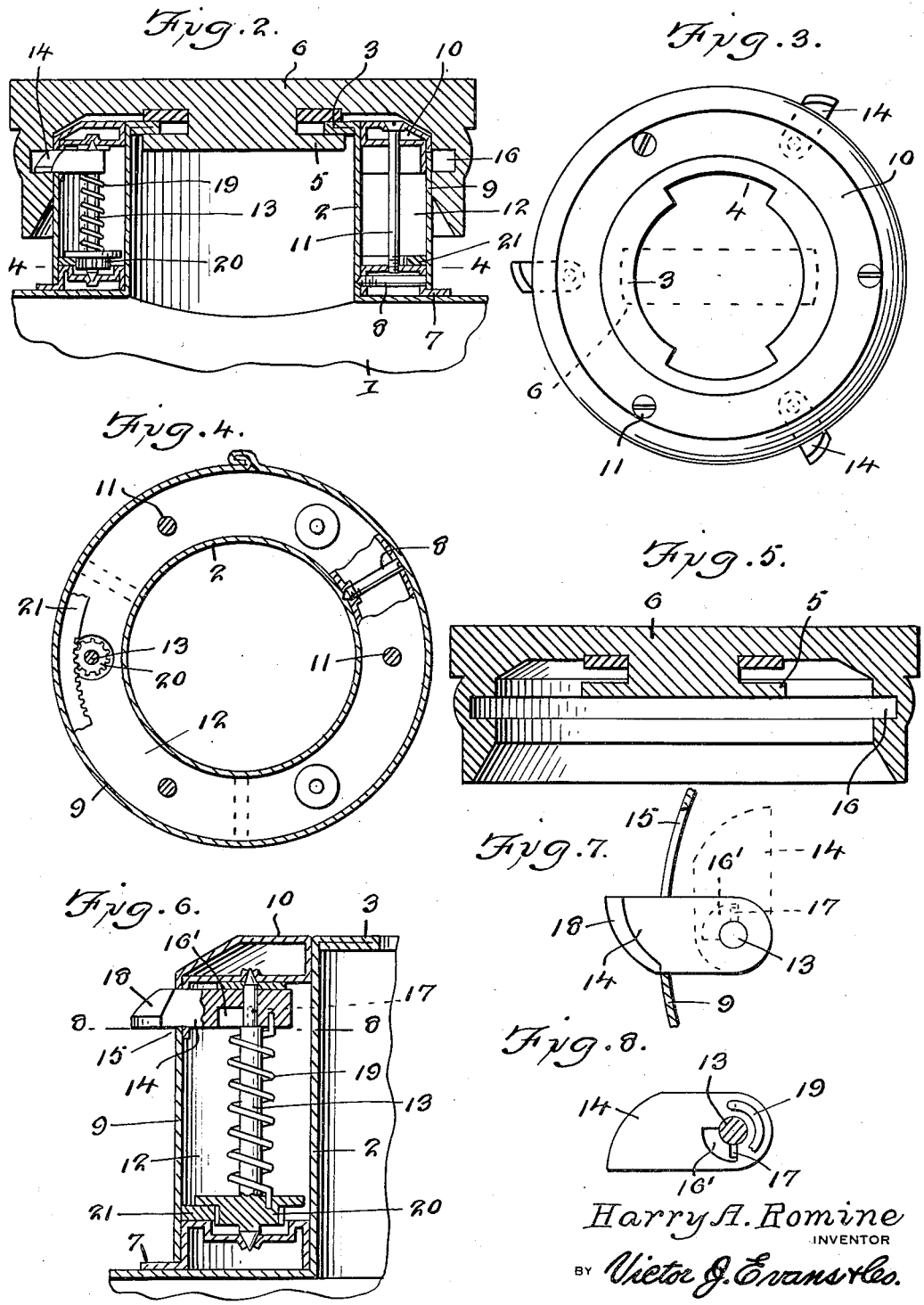

2,090,638

UNITED STATES PATENT OFFICE 2,090,638

AUTOMOBILE FUEL TANK LOCK

Harry A. Romine, Oklahoma City, Okla.

Application June 16, 1936, Serial No. 85,612

4 Claims. (Cl. 70—170)

This invention relates to fuel tank cap locks for motor vehicles, and has for the primary object the provision of a device of this character which may be easily and quickly adapted to a motor vehicle and the fuel tank thereof, whereby the cap of the tank can be locked against unauthorized removal thereby preventing theft of the fuel and which may be easily released or unlocked by the driver or proper authorized person of the motor vehicle to permit filling of the tank with fuel in the usual way without the driver leaving the motor vehicle and which will be self-locking on the application of the cap on the fuel tank.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a diagrammatical view showing an automatic fuel tank cap lock for motor vehicles constructed in accordance with my invention with certain parts thereof in elevation and other parts in section.

Figure 2 is a fragmentary vertical sectional view illustrating the locking of the cap to the tank.

Figure 3 is a plan view with the cap removed.

Figure 4 is a sectional view taken on the line 4—4 of Figure 2.

Figure 5 is a sectional view illustrating the cap.

Figure 6 is a fragmentary vertical sectional view showing one of the locking dogs and a part of the operating means therefor.

Figure 7 is a fragmentary horizontal sectional view showing one of the locking dogs in locking position in full lines and in releasing position in dotted lines.

Figure 8 is a sectional view taken on the line 8—8 of Figure 6.

Figure 9 is a fragmentary horizontal sectional view showing an operating means for the lock affected by the door of a motor vehicle.

Figure 10 is a fragmentary front elevation illustrating a combined operating and locking means and showing it in a position to prevent release of the locking means of the cap.

Figure 11 is a view similar to Figure 10 showing the position of the combined operating and locking means to permit actuation of the lock operating means of the cap by the door of the vehicle.

Figure 12 is a view similar to Figures 10 and 11 showing the combined operating and locking means positioned to free the cap.

Referring in detail to the drawings, the numeral 1 indicates a fuel tank of a motor vehicle having the usual filling neck 2 equipped with securing flanges 3 providing therebetween notches 4 to permit flanges 5 of a cap 6 to pass the flanges 3 on the application of the cap to the neck and to pass under the flanges 3 on turning of the cap relative to the neck, thereby effectively securing the cap to the neck.

Surrounding the neck 2 and resting on the tank 1 is a base plate 7 secured to the neck 2 by fasteners 8. The fasteners have threaded engagement with the base plate and are received in notches formed in the neck. Surrounding the neck 2 and resting on the base plate is a sleeve 9. Resting on the sleeve 9 and contacting the neck 2 is an annular retaining element 10 detachably secured to the base plate 7 by fasteners 11, the latter having threaded engagement with the base plate and passing through openings in the retaining member or element 10. The cap when applied to the neck 2 overlies the retaining element 10 and a portion of the sleeve, preventing unauthorized removal of the fasteners 11 and the fasteners 8 are prevented from being removed by the sleeve 9. The sleeve 9 cooperates with the neck 2 in forming an annular chamber 12 and arranged vertically within the chamber are shafts 13 having their ends journaled to the base plate 7 and to the retaining member 10. Dogs 14 are journaled on the shafts 13 for limited rotation relative thereto and beyond said rotation are adapted to turn with the shafts. The dogs 14 operate through slots 15 formed in the sleeve 9. These dogs extending through the slots 15 are adapted to enter notches 16 formed in the cap 6 thereby effectively locking the cap to the neck 2 against rotation, which with the flanges 4 and 5 prevent removal of the cap from the neck. The dogs are provided with notches 16' in which operate pins 17 secured to the shafts 13 whereby said dogs are free to turn relative to the shafts 13 for a limited distance and beyond said distance the dogs are adapted to be turned by the shafts. The free ends of the dogs are beveled, as shown at 18, for the purpose of facilitating the application of the cap to the neck, that is, when the cap is applied to the neck. Due to the bevels 18 the dogs will be caused to swing on the shafts until said dogs may enter the notches 16, thereby bringing about locking of the cap to the neck. Therefore, it will be seen that the cap may be applied to the neck in the usual manner by a turning movement relative to the neck and when the dogs align with said notches said dogs snap into the notches and thereby secure the cap against turning movement on the neck and when the cap cannot be turned relative to the neck, consequently the flanges 3 and 5 cannot be disengaged. Surrounding the shafts 13 are coil springs 19, each having one end secured to a gear 20 formed on the shaft and the other end secured to the dog journaled on the shaft. The springs act to position the dogs in locking position or outwardly through the sleeve 9 by way of the slots 15.

A ring gear 21 is journaled on the base plate 7 within the sleeve and meshes with the gears 20 so that by rotation of the gear in one direction the dogs will be retracted from the notches 16 of the cap so that the latter may be removed from the filling neck 2 in the usual way.

An operating means 23 is connected to the ring gear for imparting rotation thereto and which will be hereinafter more fully described. An offset 24 is formed on the ring gear to which the operating means 23 is connected and the sleeve 9 is offset, as shown at 25, to permit free movement of the offset 24 on the ring gear and the bore thereof has secured therein a part of the operating means 23.

A flexible housing 26 has one end secured in the bore of the offset 24 and the other end secured in a sleeve 27 formed on a housing 28. Operating through the flexible housing 26 is a flexible rod or element 29, one end of which is connected to the offset 24 of the ring gear and the opposite end extends into the housing 28 and is pivotally connected to one end of a door actuated member 30 pivoted in the housing, as shown at 31, and including a hook-shaped portion 32 and a hinged section 33 to which the flexible member 29 is pivoted. The housing 28 has a slot 34 through which the hook-shaped end 32 of the door actuated member 30 may extend and which is extended through said slot through the action of a spring 35. The pivotal connection between the member 30 and the section 33 thereof is such that the pivotal movement of the member 30 in one direction will impart a pull on the flexible element for rotating the ring gear. However, said flexible element 29 may be moved in said direction by a combined operating and locking means 36 without effecting pivotal movement to the member 30. The housing 28 includes a cylinder 37 through which the flexible member 29 extends and located therein is a coil spring 38 acting on a collar 39 secured to the flexible element 29 for urging the same in a direction for turning or rotating the ring gear to reposition the dogs 18 in locking position after being moved into releasing position. The housing 28 is secured to the door frame of a motor vehicle so that when the member 30 extends out of said housing 28 it will be in the path of movement of the automobile door 40. The door 40 when in door closing position forces the member 30 to pivot within the housing 28 allowing the spring 38 to act on the flexible member 29 to position the ring gear to bring the dogs 18 into locking position. However, when the door 40 is opened the spring 35 acts upon the member 30 causing a pull on the flexible member 29 rotating the ring gear, retracting the dogs 18 from the notches 16 of the cap, freeing the latter so that it may be rotated relative to the neck 2 for the removal thereof from the neck 2. Consequently, it will be seen that as long as the door 40 is in closed position the cap is locked to the filling neck. However, by the simple opening of the door the cap is automatically released whereby it may be removed from the filling neck in the usual manner. When the automobile door is locked in the usual manner, the cap through the mechanism described will also be locked against unauthorized removal or until such time that the automobile door is opened.

The combined locking and operating means 36 includes a key controlled lock 41 of a conventional construction including a handle 42 and movable with the lock barrel is a segmental-shaped plate 43 presenting a cam face 44 and having located at the ends thereof stops 45 and 46, the stop 46 being in the form of a hook. The cam face adjacent the hook has a notch 47. The combined operating and locking means 36 may be located on the instrument board of the motor vehicle or any other place suitable within the motor vehicle and in convenient reach of the driver. The combined operating and locking means 36 also includes a housing 44' in which operates the plate 43 and located in said housing 44 is a cylinder 45' extending exteriorly of the housing 44' and has connected thereto one end of a flexible housing 46', the other end being connected to a sleeve 47' formed on the housing 28. A flexible element 49' extends through the housing 46' and has one end pivoted to the section 33 of the door actuated member 30 and the other end is connected to an arm 50 operating in the housing 44' and rides upon the cam face 44 of the plate 43. A spring 51 is located in the cylinder 45' and bears on a collar 52 secured to the flexible element 49' acting to retain the arm 50 in engagement with the cam face 44 with a desired pressure.

The handle 42 of the combined operating and locking means 36 may assume three positions, as shown in Figures 10, 11 and 12. The handle 42 when in the position shown in Figure 10, positions the hook 46 of the plate 43 to overlie the arm 50 retaining the arm 50 in a position for holding the door operating member 30 within the housing 28 and disengaged from the door 40 and with the dog 14 in locking position preventing the removal of the cap from the neck. The door 40 may then be opened and closed without effecting the release of the cap from the tank. The lever when in the position shown in Figure 10 may be locked in said position by a key. Also the lever may be left in the position shown in Figure 10, and locked when the motor vehicle is left unattended so that should the door 40 be opened the cap will still remain locked to the tank. The handle 42 when in the position shown in Figure 11 positions the hook 46 out of the path of movement of the arm 50 freeing the arm 50 so that when the door 40 is opened the spring 35 may act on the member 30 and cause rotation of the ring gear in a proper direction for releasing the dogs from the notches in the cap so that the latter may be removed from the filling neck of the tank in the usual way. The door after the removal of the cap from the filling neck may be closed and the cap replaced on the filling neck in the usual manner due to the mounting of the dogs on the shafts 13.

Should the driver desire to release the cap from the filling neck of the tank by actuating the handle 42 the latter is moved into the position shown in Figure 12 so that an endwise movement will be imparted to the arm 50 by the cam face 44 exerting a pull on the flexible elements 49' and 29 rotating the ring gear in the proper direction to bring about release of the dogs from the notches of the cap.

Having described the invention, I claim:

1. In combination with a fuel tank having a filling neck and a closure cap releasably secured thereto and provided with keeper notches, a housing mounted on said neck and non-removable therefrom during the application of the cap to the neck, shafts journaled in said housing, dogs journaled on said shafts for a limited rotation relative thereto and adapted to enter the keeper notches, a drive means between the shafts and the dogs permitting said dogs to have a limited rotation relative to the shafts, spring means acting on said dogs to position the latter to enter the keeper notches when aligned therewith, a ring gear journaled in the housing and geared to said shafts, and means for rotating the ring.

2. In combination with a fuel tank having a filling neck and a closure cap releasably secured thereto and provided with keeper notches, a housing mounted on said neck and non-removable therefrom during the application of the cap to the neck, shafts journaled in said housing, dogs journaled on said shafts for a limited rotation relative thereto and adapted to enter the keeper notches, a drive means between the shafts and the dogs permitting said dogs to have a limited rotation relative to the shafts, spring means acting on said dogs to position the latter to enter the keeper notches when aligned therewith, a ring gear journaled in the housing and geared to said shafts, means connected to the ring gear for imparting rotation thereto, said dogs having beveled faces to permit the cap to move the dogs into non-locking position during the application of the cap to the neck, with said dogs turning free of the shafts.

3. In combination with a fuel tank having a filling neck and a cap removably secured thereto, a locking means for the cap to the neck, a door actuated pivoted member connected to said locking means and adapted to ride against a door of a vehicle so that on opening said door, said door actuated member may assume a position for releasing the locking means and thereby freeing the cap for removal from the neck, a spring acting on said door actuated member to position the latter in the last stated position, and a combined operating and locking means for effecting the operation of the first-named locking means and capable of preventing actuation of the latter.

4. In combination with a fuel tank of a motor vehicle having a filling neck and a cap removably secured thereto, a locking means for the cap to the neck, a housing secured to the motor vehicle adjacent the door thereof, a door actuated member pivoted in said housing and adapted to receive pivotal movement during the opening and closing of the door, means for connecting said member to the locking means, a spring operating on said member to move the latter into a position for releasing the locking means on the opening of the door, said door actuated member including a hinged section capable of being moved without effecting movement to the door actuated member, a second housing secured to the motor vehicle, a combined operating and locking means carried by the second housing and including a handle capable of three positions and capable of being locked in one of said positions, a cam-shaped plate having a notch, stops formed on the cam-shaped plates and one of said stops being of hook-shaped formation, an arm riding the cam face of the plate and adapted to engage either of said stops and within the notch, and means for connecting the arm to the section of the door actuated member.

HARRY A. ROMINE.